United States Patent [19]

Steward et al.

[11] Patent Number: 5,045,691

[45] Date of Patent: Sep. 3, 1991

[54] OPTO-ELECTRONIC SYSTEM FOR MEASURING AND DISPLAYING ROTARY MOVEMENT

[75] Inventors: W. Paul Steward, Humble; Peter M. Sevick, Spring; Thomas J. Poorman, Houston, all of Tex.

[73] Assignee: Sensors Unlimited Inc., Houston, Tex.

[21] Appl. No.: 471,546

[22] Filed: Jan. 29, 1990

[51] Int. Cl.$^5$ .............................................. G01D 5/34
[52] U.S. Cl. ................................. 250/231.16; 250/577
[58] Field of Search ....................... 250/231.13, 231.14, 250/231.16, 577, 227.11, 227.21; 73/293, 314; 340/619, 623

[56] References Cited

U.S. PATENT DOCUMENTS

| | | | |
|---|---|---|---|
| 3,758,776 | 9/1973 | Trohne et al. | 250/231.14 |
| 3,961,184 | 6/1976 | Schurrer | 250/231.14 |
| 4,096,383 | 6/1978 | Mancini et al. | 250/231.16 |
| 4,162,399 | 7/1979 | Hudson | 250/231.14 |
| 4,193,199 | 3/1980 | Whiteley et al. | 250/231.16 |
| 4,634,862 | 1/1987 | Matsunaga et al. | 250/231.14 |
| 4,637,264 | 1/1987 | Takahashi et al. | 250/231.16 |

FOREIGN PATENT DOCUMENTS 0207827 12/1982 Japan .................................. 250/577
0102112  6/1984 Japan .................................. 250/577

Primary Examiner—David C. Nelms
Assistant Examiner—S. Allen
Attorney, Agent, or Firm—James L. Jackson

[57] ABSTRACT

An optical fiber rotary measurement sensor for flow meters and other mechanical devices incorporates a housing having an encoder disc mounted by a drive shaft for driven rotation, the drive shaft being driven by a flow meter mechanism or by any other mechanical device. The encoder forms evenly spaced light absorbing and light reflecting areas at the outer periphery thereof and optical fibers are positioned to project light onto and receive reflected light from the outer periphery of the encoder disc. An opto-electronic signal processor receives reflected light pulses from the reflective surface areas and translates the light pulses into electrical pulses. The electrical pulses are in turn input to electronic display circuitry for providing a digital, analog or other suitable display representative of the rotation of the encoder disc and thus representative of rotary output movement of the flow meter or other mechanical device.

18 Claims, 3 Drawing Sheets

FIG. 3
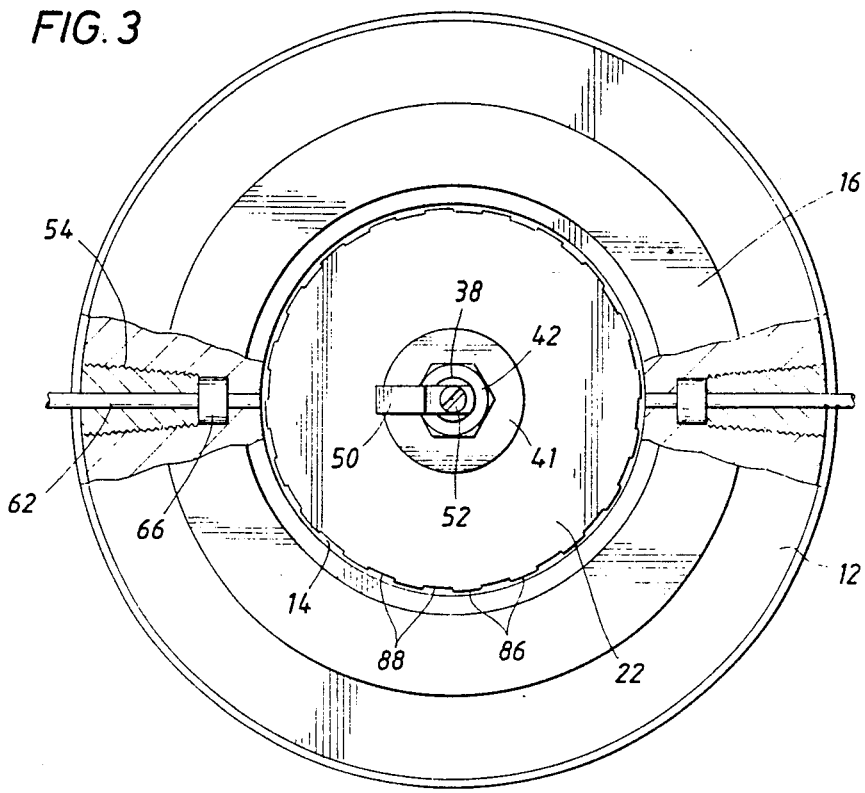
FIG. 3A
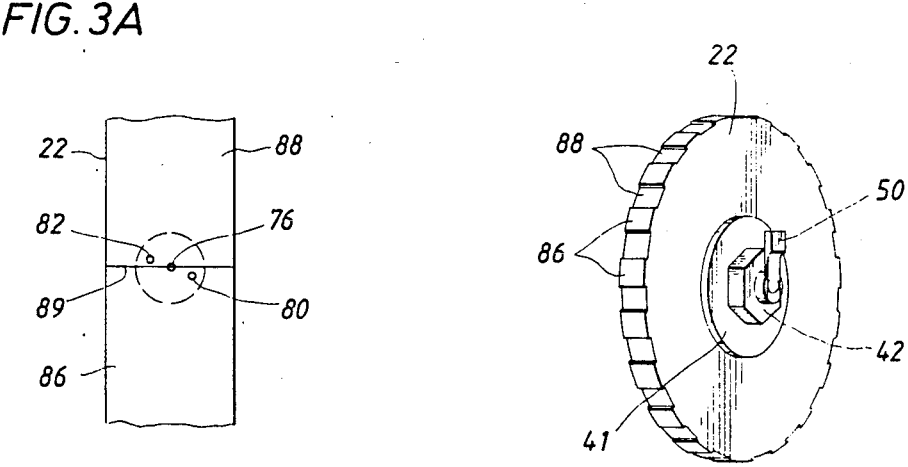
FIG. 4

OPTO-ELECTRONIC SYSTEM FOR MEASURING AND DISPLAYING ROTARY MOVEMENT

FIELD OF THE INVENTION

This invention relates generally to measurement systems for measuring mechanical movement, for determining liquid level or for measurement of a flowing liquid or gaseous medium. More specifically, this invention relates to an optical fiber pulse counter and pulse processing system which may be provided in any one of a number of simple forms for measuring mechanical movement, for volumetric measurement of liquids and gases for liquid level sensing and for variable point measurement sensing such as when volume of liquid in a vessel is measured by sensing the liquid level within the vessel. Even further, this invention relates to accurate measurement utilizing optical fiber apparatus which induces light pulses representative of mechanical movement to a signal processor which converts the light pulses into electrical pulse signals for use in the operation of any analog or digital display.

BACKGROUND OF THE INVENTION

Where liquid level measurement, gas or liquid flow measurement and the like are being conducted in the presence of an explosive or other hazardous environment, electrically or electronically operated measuring equipment is typically avoided because of the hazards that are prevalent when electrical apparatus is employed. For the most part such measuring equipment is of mechanical nature or of electromagnetic nature such that the measurement signals provided thereby may be safely converted into electrical signals and processed at a remote location.

In cases where electrical activity is located in a hazardous environment such as when explosive vapors may be present, it is typical for the electronic equipment and circuitry to be isolated by means of sealed closures, metal conduits and the like. Further, to ensure against the possibility of electrical potential transfer along the electrical circuitry, the hard metal conduits which isolate the circuitry from the potentially explosive environment are provided with internal safety barriers. Such installations are very expensive and thus detract from the commercial feasibility of the activity to the extent that mechanical measurement devices are preferred if at all possible.

Since many flow measurement devices, liquid level sensors, etc. are of mechanical nature, they are subject to a number of anomalies that are inherent in mechanical devices. Mechanical flow and level measurement devices are subject to some degree of inaccuracy because integrated moving parts tend to become worn and mechanical accuracy is therefore subject to deterioration through use and time. Further, mechanical measurement devices are subject to becoming fouled by dirt and by the products that are being measured and tend to become inaccurate as the result of fouling. It is desirable, therefore, to provide a measurement system capable of measuring the flow of gases and liquids and also being capable of measuring the liquid level within vessels. It is also desirable to provide a measurement system that is capable of extreme accuracy and a high degree of resolution, is inherently safe and is not subject to inaccuracy due to wear or fouling of the mechanical components thereof.

SUMMARY OF THE INVENTION

It is a primary feature of the present invention to provide a novel measuring system that is capable of developing light pulses corresponding to mechanical movement, which light pulses are converted to electrical form at a safe remote location and which are processed and employed for accurately indicating movement of mechanical devices.

It is also a feature of this invention to provide a novel measuring system which incorporates an optical fiber system that insures that electrical components of the measurement system may be located remotely and in protected relation from the site of measurement sensing to thereby provide a measuring system that is inherently safe.

It is an even further feature of this invention to provide a novel measurement sensing system wherein rotation of a turbine meter responsive to the flow of a liquid or gaseous fluid medium is translated directly and proportionately to a rotary encoder, which through the optical fiber system, translates the rotary movement into a multiplicity of light pulses which are then communicated to a remotely located opto-electronic processing system converting the light pulses to electronic pulses that are indicative of turbine meter rotation and thus indicative of the volume of liquid flow.

It is an important feature of this invention to provide a novel optical fiber measurement sensor having the capability of providing redundant pulses of light corresponding to mechanical movement and providing for quadrature counting of pulses to provide for sensed measurement having fine resolution.

It is an even further feature of this invention to provide a novel sensing system that creates digital pulse outputs in increments of 0.001 to 0.100 inches for extremely accurate measurement of the volume of flowing fluid such as liquids and gases, for accurate measurement of product level within a vessel and for variable point level sensing for the purpose of volumetric accuracy.

It is an even further feature of this invention to provide a novel measurement system incorporating an optical fiber sensor that is immune to electromagnetic interference and radio frequency interference. Finally, it is also an important feature of this invention to provide a novel optical fiber measurement system which is of simple nature is reliable in use and low in cost.

Other and further objects and features of this invention will become obvious upon an understanding of the embodiments disclosed herein which embodiments are representative of, but not limiting of the spirit and scope of the present invention.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figure 1:
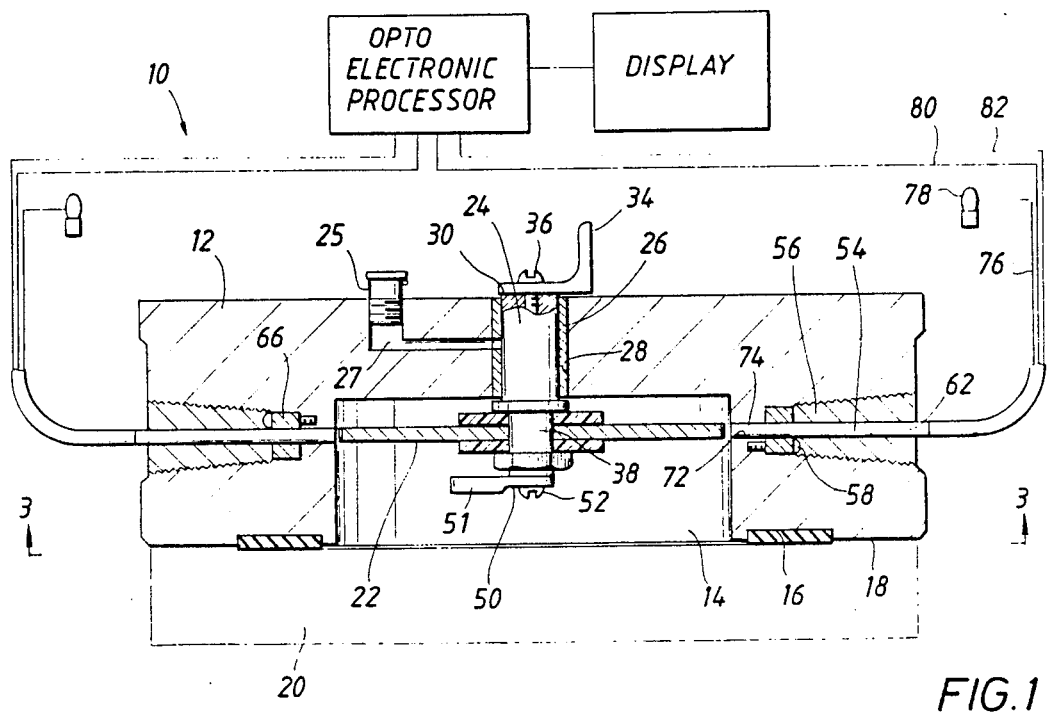

IN THE DRAWINGS:

FIG. 1 is a sectional view of a measurement encoder assembly having two opposed optical fiber sensors for signal redundancy and quadrature counting and a signal processing system and being constructed in accordance with the present invention.

Figure 2:
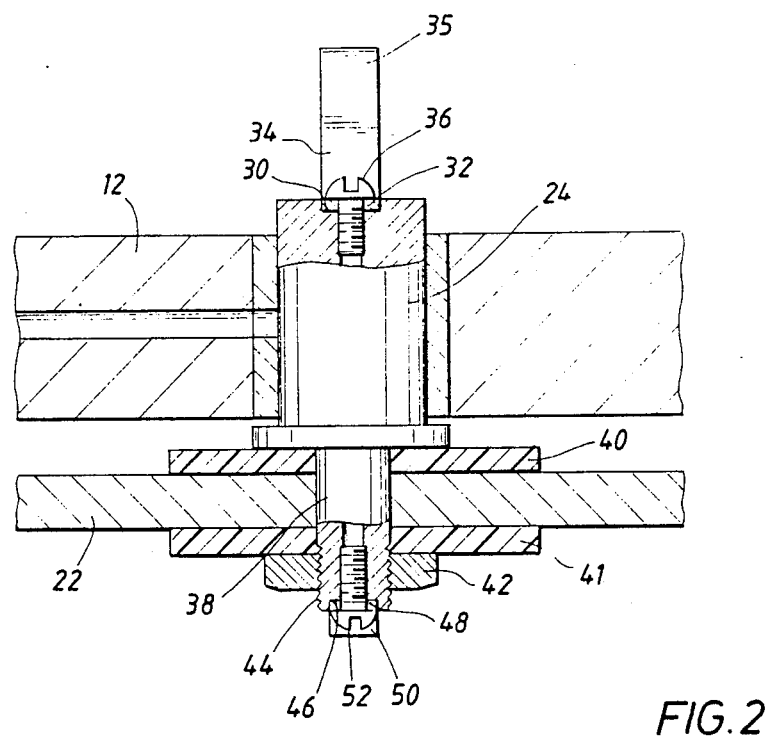

FIG. 2 is a fragmentary sectional view of the encoder support and drive shaft assembly of FIG. 1 illustrating further details thereof.

FIG. 3 is a bottom view taken along line 3—3 of FIG. 1 and showing further details of the encoder and encoder support assembly of FIG. 1.

FIG. 3A is a fragmentary view illustrating a part of the outer peripheral surface of the encoder disc and the relation of the optical fibers thereto.

FIG. 4 is an isometric illustration of the encoder disc of the measurement encoder assembly of FIGS. 1 and 3.

Figure 5:
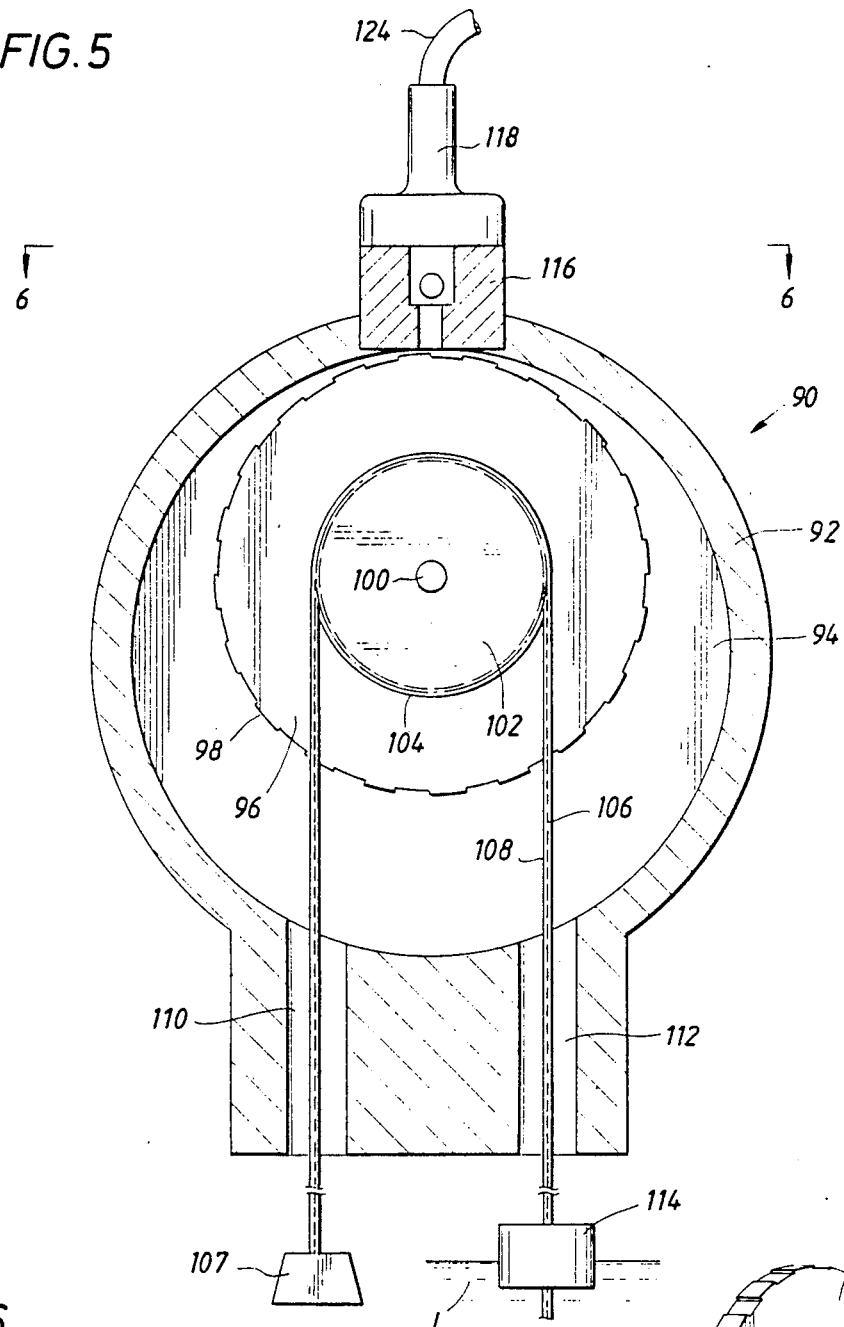

FIG. 5 is an elevational view of an optical fiber pulse encoder representing an alternative embodiment of this invention.

Figure 6:
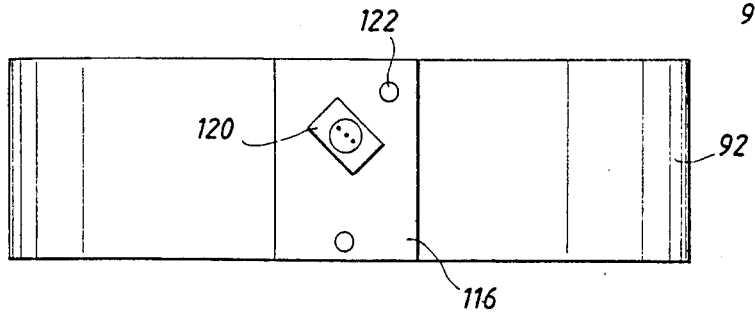

FIG. 6 is a plan view of the optical fiber encoder of FIG. 5 illustrating the sensor mount and orientation structure thereof in detail.

Figure 7:
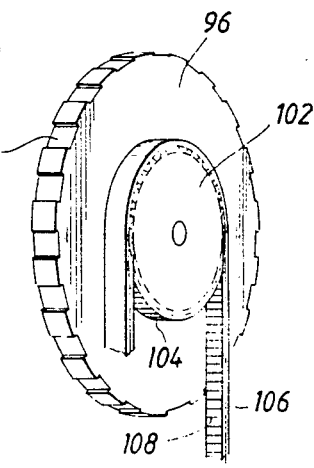

FIG. 7 is an isometric illustration of the circular signal encoder rotor of the apparatus of FIGS. 5 and 6 and partially illustrating the belt drive system therefor.

DETAILED DESCRIPTION OF PREFERRED EMBODIMENT

Referring now to the drawings and first to FIGS. 1, 2 and 3 an optical fiber encoder assembly is illustrated generally at 10 which is capable of being driven by any suitable rotary measurement system, such as a gas flow meter for example, for the purpose of measuring volumetric flow of gas for industrial or domestic billing purposes at the point of custody transfer. These types of gas meters are typically employed in the volumetric measurement of natural gas use by both commercial and domestic customers. The encoder assembly may also measure rotary mechanical movements and may find use in accurately positioning mechanical apparatus such as rotary valves for example. The optical fiber encoder mechanism 10 could be disposed in driven assembly with a rotary output of a conventional turbine gas meter or other similar measurement devices as will be discussed hereinbelow and will be operative to provide extremely accurate and intrinsically safe gas flow measurement. The sensor head is completely passive and has no electrical connections, thus promoting its intrinsic safety when flammable or otherwise hazardous materials are being measured. This is especially important when petroleum products such as natural gas, crude, oil, gasoline, etc. are measured. Although this invention is described herein typically as it relates to gas flow meters and the volumetric measurement of gas, especially natural gas, it should be born in mind that the optical fiber encoder will have equal application to the volumetric measurement of flowing liquid compositions and will also be capable of measuring various types of mechanical movement having a rotary output.

The optical fiber encoder mechanism 10 includes a body structure 12 which may be composed of any suitable metal or polymer composition that is suitable for the purpose intended. Typically the body structure 12 will be composed of a reasonably light weight metal composition such as aluminum or alloys thereof. The body structure 12 defines an encoder rotor cavity 14 and further defines a seal groove 16 which is formed in a face surface 18 of the body and which receives an elastomeric sealing ring or other suitable sealing element for the purpose of establishing a seal between the body 12 and any other apparatus that is brought into engagement with the face surface 18. For example, as shown in broken lines in FIG. 1. The body structure may be retained in sealed assembly with a gas flow meter 20. The body structure 12 may also be employed to provide a supporting interface with a graphical chart recorder to provide a charted readout of the volumetric measurement sensed by the encoder assembly.

Within the encoder cavity 14 is provided an encoder disc 22 which is supported by a drive shaft 24 that is in turn supported by a bushing 26 or other suitable bearing that is received within a bearing aperture 28 formed by the body 12. A lubricant fitting 25 is connected to the body 12 in communication with a lubricant passage 27 for lubrication of the bushing/shaft interface as required. The outer extremity of the drive shaft 24 forms a keyway 30 within which is received the key portion 32 of a top driver dog element 34 The key portion 32 is retained in immovable assembly within the keyway 30 by means of a screw 36 or other suitable locking device which extends through an appropriate opening in the key portion 32. The top driver dog is an L-shaped element defining an offset, laterally projecting arm 35 that is disposed for driving engagement with the rotatable input element of a chart recorder that may be used in conjunction with the optical fiber sensor to provide redundancy. The encoder disc 22 is supported in non-rotatable relation with an axially extending projection 38 of the drive shaft 24. The encoder disc is secured in assembly with the shaft projection 38 by means of washers 40 and 41 and nut 42, the nut being received by an externally threaded extremity 44 of the drive shaft 24.

The externally threaded extremity 44 of the drive shaft extension 38 forms a keyway 46 within which is received the key portion 48 of a bottom driver dog 50. A screw 52 or other suitable retainer device extends through an appropriate aperture formed in the key portion of the bottom driver dog and thus secures the bottom driver dog in immovable relation with respect to the drive shaft. The bottom driver dog 50 defines a laterally extending projection 51 which is disposed for driven engagement with the drive output of any suitable gas or liquid flow measurement apparatus such as the turbine meter shown in broken lines at 20. This feature enables the apparatus of the present invention to have the capability of providing both a mechanical output relating to measurement and an opto-electronic signal system also relating to the measurement detected thereby.

As mentioned above, the encoder assembly 10 is an optical fiber encoder assembly capable of providing one or more optical pulse outputs which are conducted to a remote location for the purpose of signal processing by means of an opto-electronic processor. One suitable means for accomplishing this feature may conveniently take the form of an optical fiber sensor 54 which is located within a sensor receptacle 56 and is secured therein by means of a suitable retainer 58 such as a retainer screw. As shown, the retainer screw 58 also serves as a locating device to ensure proper orientation of the exposed ends of the optical fibers relative to demarcation lines defined by the encoder disc. Orientation of the optical fibers will be discussed herein in connection with FIG. 6. The optical fiber sensor 54 forms an enlarged sensor base 66 which is fixed at a predetermined orientation by the retainer screw 58. The body 12 also forms at least one sensor passage 72 through which projects an axially extending portion 74 of the sensor which forms the optical fiber pick up portion of the sensor. As shown in FIG. 1, the body 12 defines two identical sensor receptacles and sensor passages. From the optical fiber sensor 54 extends a plurality of optical fibers which are preferably encased within a protective sheath. One of the optical fibers 76 is a light emitter with one end thereof being disposed in light receiving relation with a light source 78 while its other end is exposed in light transmitting relation at the lower end of the axially extending portion 74 of the sensor 54. Light emitted from the optical fiber 76 is projected onto the external periphery of the encoder disc 22 for purposes to be discussed hereinbelow. One or more optical fibers 80 and 82 have the lower ends thereof also exposed at the lower end of the axially extending portion 74 of the sensor for the purpose of picking up light reflected from the outer periphery of the encoder disc 22. The sensor head allows for two optical fiber pick-ups for delivery of light pulse signals to an opto-electronic package provides the user with the option of redundant sensing or quadrature position sensing to thus provide for high resolution. The opposite ends of the optical fibers 80 and 82 are coupled to the input of an opto-electronic processing circuitry having the capability of translating optical pulses transmitted by the optical fibers to electrical pulses which are further processed to form an electrical pulse output for energization of an appropriate measurement display such as a digital display for example. Two optical fibers 80 and 82 are employed when rotation of the encoder disc is bi-directional but where the encoder disc is unidirectional a single light pulse transmitting optical fiber will normally be employed in each optical fiber sensor. For processing to the form of electronic pulse signals which are then employed as control pulses for other activities, the two optical fiber pick-ups allow for bi-directional sensing of motion. An example of this could be adaptation of flow measurement for flow lines where the direction of fluid flow may be reversed. The provision of two or more optical fiber sensors as shown in FIG. 1.

As shown in FIGS. 3 and 4 the outer periphery of the encoder disc 22 forms a plurality of alternating light absorbing areas such as shown at 86 and light reflective areas such as shown at 88. The optical fiber 76 of each sensor is oriented to project light onto these light absorbing and light reflecting areas while optical fibers 80 and 82 are disposed to receive reflected light. The sensitivity of the opto-electronic processing circuitry may be adjusted to insure that appropriate light signals will be transmitted, received and processed to thus provide a plurality of electrical pulses to the measurement display for each rotation of the encoder disc.

As shown in FIG. 3A, where to optical fiber pick-ups are employed for bi-directional sensing the angular arrangement of the emitter and receiver fibers may take the form shown. The intersection of the light reflective surfaces 88 with the light absorbing surfaces 86 form sharply defined demarcation lines such as shown at 89. With the emitter fiber located at the demarcation line as shown, its emitted light from the reflective surface 88 would be reflected from the light absorbing surface 86 so the optical fiber 80 would receive insufficient reflected light for acceptance by the opto-electronic processor. The optical fiber circuit 82 is thus "on" while the optical fiber circuit 80 is "off". The opto-electronic processor may be programmed to accept light pulse signals from only one of the fibers 80 or 82 when the encoder disc 22 is rotating clockwise and from the opposite optical fiber when counter-clockwise rotation of the encoder disc is occurring.

Referring now to FIGS. 5 and 6 an alternative embodiment of the present invention is disclosed which may be conveniently employed as a liquid level sensor for the purpose of accurately measuring volumes of liquid introduced into or withdrawn from a vessel. The liquid level measurement apparatus of FIG. 5 is illustrated generally at 90 and incorporates a housing structure 92 forming an internal chamber 94 within which is rotatably mounted an encoder disc 96 having an outer peripheral surface 98 of the general configuration illustrated in FIG. 4. The encoder disc 96 is supported for rotation within the chamber 94 by means of a support shaft 100 which is rotatably mounted to the body structure by a bearing or bushing in the manner shown in FIG. 2. Also supported by the shaft 100 and secured in non rotatable rotation with the encoder disc 96 is a drive disc 102 having an outer peripheral surface 104 defined by a multitude of closely spaced lands and grooves which are disposed in evenly spaced parallel relation. An elongate drive belt 106 is provided which forms an inner drive surface 108 including a multitude of parallel lands and grooves that mate with and establish driving relation with the lands and grooves forming the outer peripheral surface 104 of the drive disc 102.

The housing structure 102 forms a pair of belt passages 110 and 112 which permit the drive belt 106 to pass from the housing. For liquid level measurement, a float 114 is fixed to the drive belt 106 and is buoyant on the surface of the liquid to be sensed. The opposite end of the drive belt is provided with a weight 107 which substantially counter-balances the weight of the float 114. If desired, the drive belt 106 may be an endless belt with its lower end looped about an idler pulley, not shown. Alternatively the drive belt may be of and suitable character so long as it establishes a positive driving relationship with the drive disc or pulley 102 of the encoder disc 96. As the float 114 moves up or down as the liquid level rises or falls, the belt 106 will impart driving rotation to the disc 102 which will impart driving rotation to the encoder disc 96.

A mounting boss 116 is provided on the housing 92 for support of an optical fiber sensor 118 and, as shown in FIG. 6, forms an angulated receptacle 120 which orients the lower end of the optical fiber sensor such that the pick-up fibers thereof are oriented appropriately to receive reflected light from the reflected surface areas at the outer periphery of the encoder disc. In the manner described above in connection with FIG. 3A, one of the pick-up fibers is controlled by the opto-electronic processor to properly pick up reflected light pulses when the encoder disc is rotating clockwise, while the opposite optical pick-up fiber is oriented to pick up reflected light pulses when the encoder disc is rotating counter-clockwise. Thus, in the case of liquid level sensors, the optical fiber sensor is capable of accurately measuring both rising and falling liquid level as the liquid container is being filled or depleted. The sensor support boss 116 also defines an orienting receptacle 122 which receives the orienting pin of an optical fiber sensor in the same manner as discussed above in connection with FIG. 1 and depicted by reference numeral 68 and 70. The oriented end of the sensor is received within the receptacle 122 to insure that the optical fibers are properly oriented with respect to the encoder disc. The orienting receptacle 122 or a retainer and orienting screw as shown at 58 in FIG. 1 insures that the optical fiber sensor has only one position of assembly with respect to the sensor support boss 116. The optical fiber cable 124 of the sensor 118 may be arranged in the same manner as disclosed above in connection with FIG. 1 where one fiber transmits light from a suitable source onto the encoder disc. The light reflected from the encoder disc is picked up selectively by two optical fibers which are connected to the input of an opto-electronic processor for processing received light pulses and providing an electrical pulse output which is then communicated to an appropriate electronic display circuit to provide a visual, audible or graphical display of the measurement activity.

The resulting measurement systems disclosed above are intrinsically safe because they are completely passive and have no electrical connections at either of the sensing heads. The optical fiber cable may be of considerable length so that the opto-electronic processor may be located remotely from any apparatus that might be subject to explosion or other hazard. For example, where polymer optical fiber is employed the cable 124 may be in the order of 300 feet in length. Where glass optical fiber is employed, the length of the cable may be in the order of 5000 feet or so and with conventional optical fiber signal boosters may be of any desired length. The opto-electronic module converts the optical signal of the sensor into electrical pulses which can be interfaced to most controllers and counters. The sensor head allows for two optical pick-ups and opto-electronic packages giving the user the option of redundant sensing or quadrature position sensing. The optical fiber sensor has the advantage of being immune to electromagnetic interference and is intrinsically safe because there is no electrical path into the fluid being measured. There are several configurations which can give different resolution and various lead lengths. That is, the sensor can be provided with, for example, 0.1 inch, 0.01 inch or 0.001 inch accuracy and resolution especially through the use of quadrature counting by the opto-electronic processor circuitry. Metric measurements can also be accomplished. The digital sensor output eliminates drift or temperature effects associated with analog sensors. Adjustable set points can be provided to activate solenoids, pumps, or other equipment. The output can be an LCD display and/or digital bus. The optical fiber does not have to come into contact with the fluid medium. When liquid level is being accomplished, the optical fiber sensor may be configured so that the fiber is at the top of the tank. Digital optical fiber sensors have many advantages, including price, for many liquid level applications and for many other types of measurement activities.

In view of the foregoing, it is therefore seen that this invention is one well adapted to attain all of the objects and features herein set forth together with other features which are inherent in the apparatus itself.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. An optical fiber measurement sensing system for flow meters and other rotating mechanical devices, comprising:
   (a) an encoder element disposed for driven rotation and having a plurality of alternating light absorbing and light reflecting areas thereon with sharp lines of demarcation at the intersections thereof;
   (b) a source of light;
   (c) optical fiber sensor means having at least one light emitting optical fiber receiving light from said source and disposed for projection of light onto said light absorbing and light reflecting areas, said optical fiber sensor further having at least two light pick-up optical fibers disposed to receive light reflected from said light reflecting and light absorbing areas, said pick-up optical fibers being positioned relative to said light emitting optical fiber such that when said light emitting optical fibers is directed at one of said lines of demarcation, one of said pick-up optical fibers is positioned to receive reflected light from a light reflective surface and another of said pick-up optical fiber is positioned to receive reflected light from an adjacent light absorbing surface, thereby inducing sequential light pulses in said pick-up optical fibers when said lines of demarcation traverse said optical fiber sensor means, as said encoder element is rotated said reflected light forming light pulses being representative of incremental angular rotation and direction of rotation of said encoder element;
   (d) opto-electronic signal processing means having input means receiving said sequential light pulses and translating said light pulses into sequentially organized electrical pulses; and
   (e) display means receiving said sequentially organized electrical pulses and providing a display representative of the direction and angular rotation of said encoder element.

2. The optical fiber measurement sensing system of claim 1 wherein said encoder element is a disc adapted for driven rotation by any rotating mechanical device, thus providing a measurement display at said display means being proportionally representative of the rotary movement of said mechanical device.

3. The optical fiber measurement sensing system of claim 2, including:
   (a) a drive shaft disposed in non-rotatable relation with said encoder disc and supporting said encoder disc for rotation about the axis of said drive shaft; and
   (b) driven dog means projecting in non-rotatable relation laterally from said drive shaft and disposed for driven engagement by said rotating mechanical device.

4. The optical fiber measurement sensing system of claim 1, wherein:
   (a) said encoder element is a disc; and
   (b) said plurality of alternating light absorbing and reflecting areas are defined by the outer periphery of said encoder disc and are substantially equally spaced about said outer periphery thereof.

5. The optical fiber measurement sensing system of claim 4 wherein said outer periphery of said encoder disc defines substantially equally spaced raised areas forming said light absorbing areas and a plurality of substantially evenly spaced recessed surface areas forming said light reflecting areas.

6. The optical fiber measurement sensing system of claim 1 wherein said light emitting optical fiber and said light pick-up optical fibers lie in a plane disposed in angulated relation with respect to said lines of demarcation of said light reflecting areas and said light absorbing areas.

7. The optical fiber measurement sensing system of claim 1, including:
 (a) body means forming an encoder cavity having said encoder disc rotatably disposed therein, said body means forming a plurality of sensor receptacles; and
 (b) said optical fiber sensor means being a plurality of optical fiber sensors being disposed one within each of said sensor receptacles, each of said optical fiber sensors having a light emitting optical fiber and at least a pair of pick-up optical fibers, said optical fibers each being directed at said light absorbing and light reflecting areas of said encoder element.

8. The optical fiber measurement sensing system of claim 7, wherein said opto-electronic circuitry is optically communicated with each of said pick-up optical fibers of each of said optical fiber sensors and electronically processes said sequentially organized electrical pulses of each of said pick-up optical fiber sensors for clockwise and counter-clockwise angular rotational measurement of said encoder element movement.

9. The optical fiber measurement sensing system of claim 7, wherein said opto-electronic circuitry processes said electrical pulses to achieve redundant position sensing and quadrature position sensing of said encoder disc.

10. The optical fiber measurement sensing system of claim 7, wherein:
 (a) a drive shaft is rotatably supported by said body means, said encoder element being a disc disposed in non-rotatable relation with said drive shaft; and
 (b) a drive dog being disposed in non-rotatable relation with said drive shaft and being positioned for driven engagement by a rotary mechanical device for which rotary measurement is desired.

11. The optical fiber measurement sensing system of claim 10, including a driven dog disposed in non-rotatable relation with said drive shaft and being disposed for driving rotation with a rotary mechanical measuring device intended to provide redundancy of measurement with said optical fiber measurement sensing system.

12. An optical fiber measurement sensing system for fluid flow meters and other mechanical devices, comprising:
 (a) a sensor body forming an encoder cavity and forming a plurality of sensor receptacles in communication with said sensor cavity;
 (b) a drive shaft having rotatable relation with said sensor body and adapted for driven rotation by a rotary output of a mechanical device for which directionally indicated rotary measurement is desired;
 (c) an encoder element disposed in non-rotatable relation with said drive shaft and positioned for driven rotation within said encoder cavity and having a plurality of alternating light absorbing and light reflecting areas thereon and defining sharp lines of demarcation at the intersections of said light absorbing and light reflecting areas;
 (d) a source of light;
 (e) at least one optical fiber sensor means having light emitting optical fiber means receiving light from said source and disposed for projection of light onto said light absorbing and light reflecting areas, said optical fiber sensor further having at least two light pick-up optical fiber means disposed to receive light reflected from said light reflecting areas and said light absorbing areas, said pick-up optical fibers being positioned relative to said light emitting optical fiber such that when said light emitting optical fiber is directed at one of said lines of demarcation, one of said pick-up optical fibers is positioned to receive reflected light from a light reflective surface and another of said pick-up optical fiber is positioned to receive reflected light from an adjacent light absorbing surface, thereby inducing sequential light pulses in said pick-up optical fibers, when said lines of demarcation traverse said optical fiber sensor means, as said encoder element is rotated said reflected light forming light pulses being representative of incremental angular rotation and direction of rotation of said encoder element;
 (f) opto-electronic signal processing means having input means receiving said sequential light pulses and translating said light pulses into sequentially organized electrical pulses; and
 (g) display means receiving said sequentially organized electrical pulses and providing a measurement display representative of the direction and angular rotation of said encoder element.

13. The optical fiber measurement sensing system of claim 12 wherein said encoder element is a disc adapted for driven rotation by any rotating mechanical device, thus providing a measurement display at said display means being proportional to said rotary movement of said encoder disc and thus representing rotary movement of said mechanical device.

14. The optical fiber measurement sensing system of claim 12 including said optical fiber sensor means being a plurality of optical fiber sensors disposed one within each of said sensor receptacles, each of said optical fiber sensors having a light emitting optical fiber and at least two pick-up optical fibers, said optical fibers each being directed at said light absorbing and light reflecting areas of said encoder disc.

15. The optical fiber measurement sensing system of claim 14, wherein:
 (a) said body means forms a plurality of sensor receptacles in communication with said encoder cavity; and
 (b) said optical fiber sensor means being a plurality of optical fiber sensors being disposed one with each of said sensor receptacles, each of said optical fiber sensors having a light emitting optical fiber and at least two pick-up optical fibers, said optical fibers each being directed at said light absorbing and light reflecting areas of said encoder disc.

16. An optical fiber liquid level sensing system comprising:
 (a) an encoder element disposed for driven rotation and having a plurality of evenly spaced alternating light absorbing and light reflecting areas thereon, and defining sharp lines of demarcation at the intersections thereof;
 (b) at least one source of light;
 (c) a drive disc being disposed in non-rotatable relation with said encoder element;

(d) a drive belt having positive driving engagement with said drive disc and having a float at one end thereof disposed to float on the liquid being sensed, said drive belt having a counterweight at the opposite end thereof for counterbalancing said float; and (e) at least one optical fiber sensor means having light emitting optical fiber means receiving light from said source and disposed for projection of light onto said light absorbing and light reflecting areas, said optical fiber sensor means further having light pick-up optical fiber means disposed to receive light reflected from said light reflecting areas, as said encoder element is rotated said reflected light received by said light pick-up optical fiber means forming light pulses representative of rotation of said encoder element;

17. The optical fiber liquid level sensing system of claim 16 wherein:

(a) said encoder element is a disc forming said light absorbing areas and said light reflecting areas at the outer periphery thereof;

(b) said light absorbing and light reflecting areas form sharp lines of demarcation at the respective intersections thereof; and (c) said light pick-up optical fiber means comprises a pair of pick-up optical fibers positioned relative to said light emitting optical fiber such that when said light emitting optical fiber is directed at one of said lines of demarcation one of said pair of pick-up optical fiber is directed at one of said light absorbing surface areas and the other of said pair of pick-up optical fibers is directed at the adjacent light reflecting surface.

18. The optical fiber liquid level sensing system of claim 17, including:

(a) body means forming an encoder cavity having said encoder disc rotatably disposed therein, said body means forming a plurality of sensor receptacles;

(b) said optical fiber sensor means being a plurality of optical fiber sensors being disposed one within each of said sensor receptacles, each of said optical fiber sensors having a light emitting optical fiber and at least one pick-up optical fiber, said optical fibers each being directed at said light absorbing and light reflecting areas of said encoder disc;

(c) said opto-electronic circuitry is optically communicated with each of said pick-up optical fibers of each of said optical fiber sensors and electronically processes said electrical pulses of each of said optical fiber sensors for clockwise and counter-clockwise measurement of the movement of said encoder disc; and (d) said opto-electronic circuitry processes said electrical pulses to achieve redundant position sensing and quadrature position sensing of the movement of said encoder disc.

* * * * *